(12) United States Patent
Tamagawa et al.

(10) Patent No.: US 6,664,795 B2
(45) Date of Patent: Dec. 16, 2003

(54) SYSTEM FOR DETECTING REMAINING CHARGE OF ELECTRICAL DOUBLE LAYER CAPACITOR

(75) Inventors: Yutaka Tamagawa, Wako (JP); Nobuyuki Imai, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 23 days.

(21) Appl. No.: 10/052,398

(22) Filed: Jan. 23, 2002

(65) Prior Publication Data

US 2002/0097053 A1 Jul. 25, 2002

(30) Foreign Application Priority Data

Jan. 25, 2001 (JP) ........................................ 2001-017454

(51) Int. Cl.[7] ............................................. G01N 27/416
(52) U.S. Cl. ........................................ 324/548; 324/444
(58) Field of Search .................. 701/22, 102; 324/444, 324/446, 450, 548, 658

(56) References Cited

U.S. PATENT DOCUMENTS

| | | | | |
|---|---|---|---|---|
| 4,989,155 A | * | 1/1991 | Begin et al. ................. 702/62 |
| 5,325,041 A | * | 6/1994 | Briggs ........................ 320/149 |
| 6,018,694 A | * | 1/2000 | Egami et al. ............... 701/102 |
| 6,330,498 B2 | * | 12/2001 | Tamagawa et al. .......... 701/22 |

FOREIGN PATENT DOCUMENTS

| | | |
|---|---|---|
| JP | 6-261452 | 9/1994 |
| JP | 11-220810 | 8/1999 |

* cited by examiner

*Primary Examiner*—N. Le
*Assistant Examiner*—Vincent Q. Nguyen
(74) *Attorney, Agent, or Firm*—Arent Fox Kintner Plotkin & Kahn, PLLC

(57) ABSTRACT

A remaining charge detecting system of an electric double layer capacitor to be usable, for example, as an energy source of a hybrid vehicle having an internal combustion engine and an electric motor separately driving wheels. The system includes a current-voltage sensor which generates an output indicative of a terminal voltage across terminals of the capacitor and an output indicative of charge/discharge current charged into and discharged from the capacitor and an electronic control unit, comprising a microcomputer, which inputs the outputs of the current-voltage sensor indicative of the terminal voltage and charge/discharge current and calculates a remaining charge of the capacitor based on a state equation (mathematical model) having the remaining charge of the capacitor as a state variable and an observer that observes the state equation, thereby enabling simple and accurate detection of the remaining charge of the electrical double layer capacitor without need for a high-precision current sensor.

11 Claims, 5 Drawing Sheets ated carbon and an electrolyte have recently been developed and applied as, for instance, energy sources of hybrid vehicles., as taught, for example, by Japanese Laid-open Patent Application No. Hei 11(1999)-220810.

SYSTEM FOR DETECTING REMAINING CHARGE OF ELECTRICAL DOUBLE LAYER CAPACITOR

BACKGROUND OF THE INVENTION

1. Field of the Invention

This invention relates to a system for and a method of detecting or estimating the remaining charge of an electrical double layer capacitor.

2. Description of the Related Art

Various types of high-capacity electrical double layer capacitors composed of a combination of activated carbon or the like and an electrolyte have recently been developed and applied as, for instance, energy sources of hybrid vehicles., as taught, for example, by Japanese Laid-open Patent Application No. Hei 11(1999)-220810.

When an electrical double layer capacitor is used in such an application, its remaining charge must be accurately detected. The conventional technique used to detect the remaining charge has been to integrate the charge/discharge current detected by a current-voltage sensor and correct the result for the internal resistance.

When the remaining charge is detected chiefly by current integration, however, a high-precision current sensor must be utilized to achieve high detection accuracy. This makes the cost high. Since the error in the estimated remaining charge grows larger with degradation of the current sensor, moreover, the inconvenience arises of having to initialize or correct the calculated value when the electrical double layer capacitor is fully charged or has a prescribed remaining charge.

SUMMARY OF THE INVENTION

The present invention aims to overcome the foregoing problems and has as an object to provide a system for and method of detecting or estimating the remaining charge of an electrical double layer capacitor that uses a mathematical model having the remaining charge of the electrical double layer capacitor as a state variable to calculate or estimate the remaining charge of the electrical double layer capacitor from its detected terminal voltage and charge/discharge current, thereby enabling simple and accurate detection of the remaining charge of the electrical double layer capacitor without need for a high-precision current sensor.

The present invention achieves the foregoing object by providing a system for detecting remaining charge of an electric double layer capacitor, comprising: a current-voltage sensor which generates an output indicative of a terminal voltage across terminals of the capacitor and an output indicative of charge/discharge current charged into and discharged from the capacitor; and an electronic control unit which inputs the outputs of the current-voltage sensor indicative of the terminal voltage and charge/discharge current and calculates a remaining charge of the capacitor based on a mathematical model having the remaining charge of the capacitor as a state variable.

BRIEF DESCRIPTION OF THE DRAWINGS

This and other objects and advantages of the invention will be made more apparent with reference to the following description and drawings, in which.

DETAILED DESCRIPTION OF THE PREFERRED EMBODIMENTS

A system for detecting the remaining charge of an electrical double layer capacitor according to an embodiment of the present invention will now be explained with reference to the attached drawings.

Figure 1:
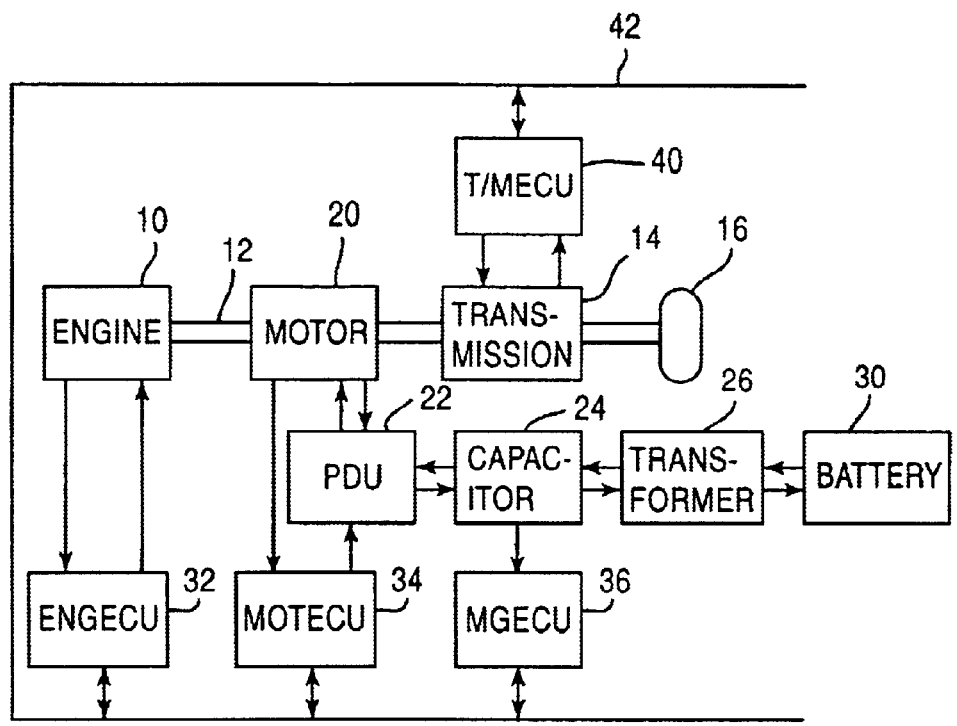
FIG. 1 is a block diagram showing the overall configuration of the system for detecting or estimating remaining charge of an electrical double layer capacitor according to an embodiment of the present invention.

FIG. 1 is a block diagram showing the overall configuration of the system for the detecting remaining charge of an electrical double layer capacitor.

In the illustrated embodiment, the system is applied for detecting the remaining charge of an electrical double layer capacitor used as an energy source in a hybrid vehicle. For simplicity of illustration, associated sensors and actuators are omitted from the drawing.

Reference numeral 10 in the drawing designates an internal combustion engine (gasoline-injection, spark-ignition, four-cylinder internal combustion engine). The output of the engine 10 is input to a transmission 14 through a drive shaft 12. The transmission 14 is connected with driven wheels 16 (only one shown) of a hybrid vehicle (not shown). The transmission 14 varies the speed ratio of the engine output transmitted to the driven wheels 16 for driving the hybrid vehicle.

An electric motor 20 is connected with the drive shaft 12 at a point between the engine 10 and the transmission 14. The motor 20 drives the driven wheels 16 independently of the engine 10 and also operates to recover energy by converting kinetic energy produced by rotation of the drive shaft 12 into electrical energy and outputting the electrical energy. The motor 20 is connected to an electrical double layer capacitor 24 through a PDU (power drive unit) 22. The PDU 22 controls the drive regeneration operation of the motor 20.

The electrical double layer capacitor 24 is of the type taught by, for example, Japanese Laid-open Patent Application No. Hei 6(1994)-261452. Specifically, it is a large-capacitance capacitor composed of electrodes made of activated carbon and an electrolyte that, under application of voltage across the electrodes, continues to charge with formation of an electrical double layer up to the decomposition voltage of the electrolyte and starts to discharge when the decomposition voltage is exceeded.

The electrical double layer capacitor 24 is connected to a battery 30 (and an electrical equipment system not shown in the drawing) through a transformer 26. The transformer 26 steps down the output voltage of the electrical double layer capacitor 24 before supplying it to the battery 30 etc. and, when the remaining charge (amount of stored electrical energy) of the electrical double layer capacitor 24 declines, steps up the output voltage of the battery 30 and supplies it to (charges) the electrical double layer capacitor 24.

An engine electronic control unit (illustrated as "ENGECU") 32 for controlling the operation of the engine 10 and a motor electronic control unit (illustrated as "MOTECU") 34 for controlling the operation of the motor 20 are provided as shown in FIG. 1. Also installed are a management electronic unit (illustrated as "MGECU") 36 for detecting the remaining charge of the electrical double layer capacitor 24 and conducting energy management, and a transmission electronic control unit (illustrated as "T/MECU") 40 for controlling operation of the transmission 14. The MGECU 36 and other ECUs are all implemented as microcomputers and are able to exchange data via a bus 42.

Figure 2:
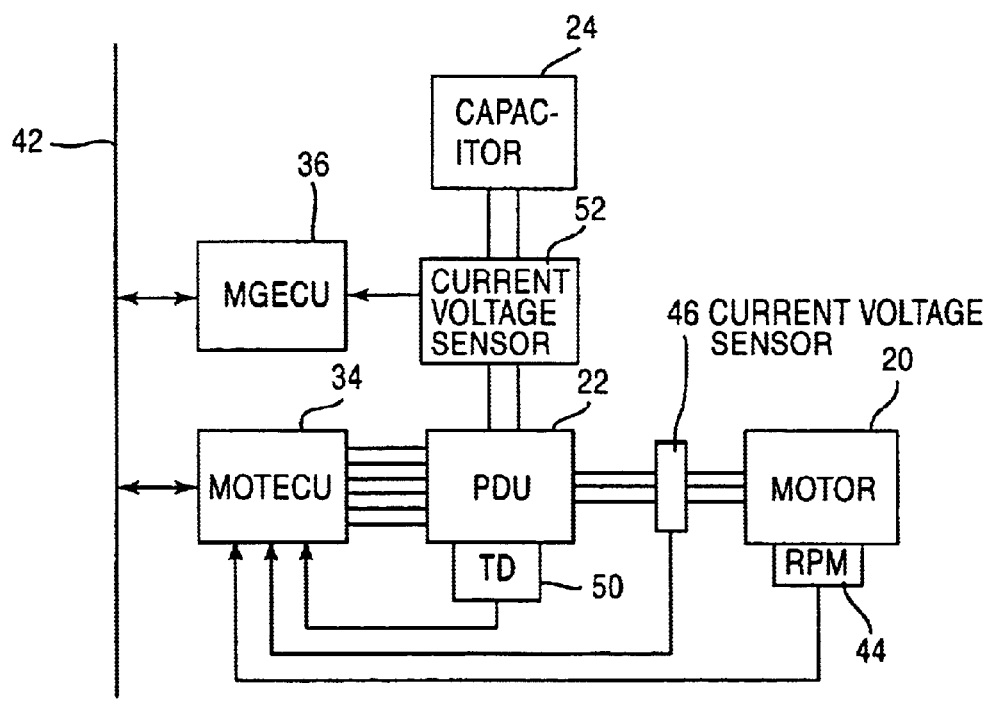
FIG. 2 is a block diagram showing in greater detail the interconnection among a motor, an electric double layer capacitor and ECUs of the configuration shown in FIG. 1.

FIG. 2 is a block diagram showing in greater detail the interconnection among the motor 20, PDU 22, electrical double layer capacitor 24, MOTECU 34 and MGECU 36 of the configuration shown in FIG. 1.

An RPM sensor 44 is installed near the motor 20, as shown in the drawing, to produce an output or signal indicative of the rotational speed of the motor 20 and output it to the MOTECU 34. Further, a current-voltage sensor 46 is installed to produce outputs or signals indicative of the current and voltage outputted by the motor 20 and forward them to the MOTECU 34. In addition, a temperature sensor (illustrated as "TD") 50 is installed near the PDU 22 and produces an output or signal indicative of the temperature of the PDU 22, more exactly the temperature of a protective resistor or the like of the drive circuit of the motor 20. The outputs of the sensors 46 and 50 are also supplied to the MOTECU 34.

Another current-voltage sensor 52 is provided in the lines connecting the electrical double layer capacitor 24 and the PDU 22 and produces an output or signal indicative of the terminal voltage Vout across the output terminals of the electrical double layer capacitor 24 and an output or signal indicative of the charge/discharge current i charged/discharged into/from the electrical double layer capacitor 24, and supplies them to the MGECU 36.

The operation of the system for detecting or estimating the remaining charge of an electrical double layer capacitor according to this embodiment will now be explained.

Figure 3:
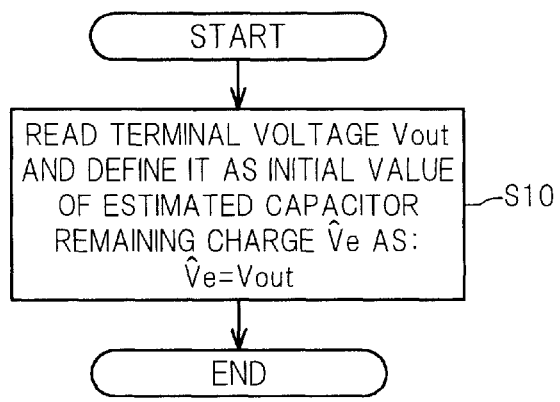
FIG. 3 is a flow chart showing the operation of the system illustrated in FIG. 1.

FIG. 3 is a flow chart showing the operation. (Precisely speaking, the illustrated operation is that of the MGECU 36.) The program is executed when the ignition key (not shown) of the hybrid vehicle installed with the system shown in FIG. 1 is turned ON (before the engine 10 starts).

In S10, the terminal voltage Vout (one of the detection values of the current-voltage sensor 52) at zero charge/discharge current i is read in and defined it as the initial value of estimated remaining charge (more precisely, estimated remaining charge-equivalent terminal voltage) Vehat (explained later) of the electrical double layer capacitor 24. The symbol above V illustrated in FIG. 3 and on indicates that the value assigned therewith is an estimated value and is named "hat" in the specification.

Figure 4:
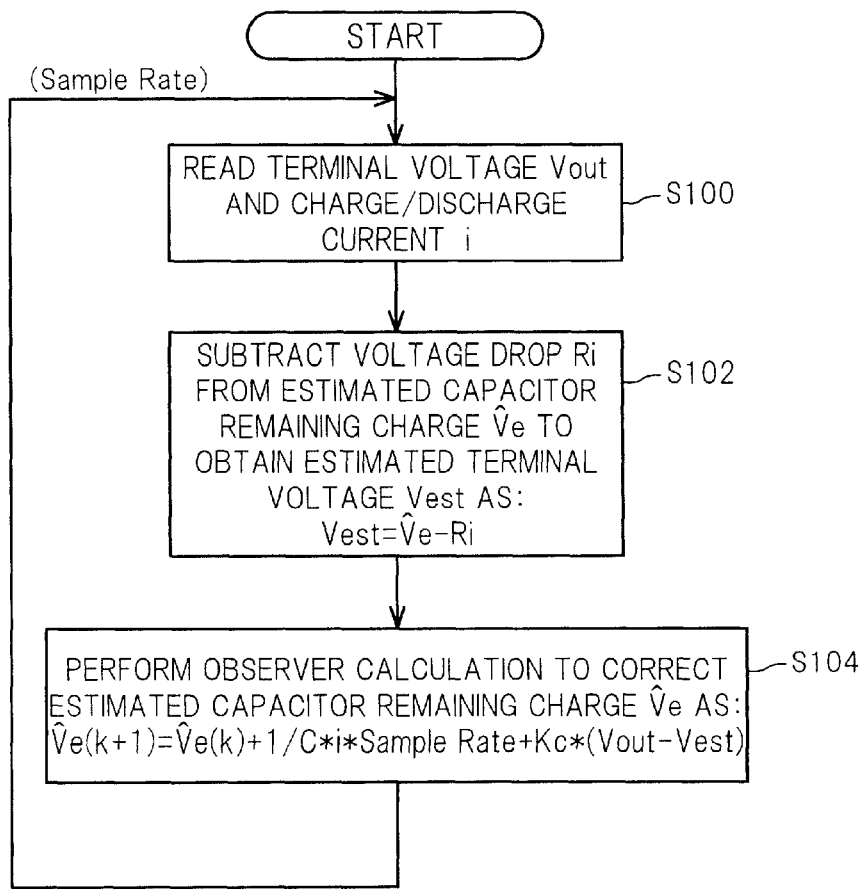
FIG. 4 is a flow chart similarly showing the operation of the system illustrated in FIG. 1 before engine starting.

FIG. 4 is a flow chart showing the operations after the engine 10 has started. This program is also executed by the MGECU 36 and is looped once every prescribed interval (e.g., 100 msec) after engine starting.

First, in S100, the terminal voltage Vout and the charge/discharge current i of the electrical double layer capacitor 24 detected by the current-voltage sensor 52 are read in. Then, in S102, the voltage drop Ri (across the electrical double layer capacitor 24, obtained by multiplying internal resistance R (assumed to be known) by charge/discharge current i) is subtracted from the estimated remaining charge (more precisely, the estimated remaining charge-equivalent terminal voltage) Vehat of the electrical double layer capacitor 24 to obtain estimated terminal voltage Vest.

Next, in S104, an observer calculation is performed to correct (update) the estimated remaining charge (more precisely, estimated remaining charge-equivalent terminal voltage) Vehat of the electrical double layer capacitor 24.

The processing of FIGS. 3 and 4 will now be explained with reference to FIG. 5.

Figure 5:
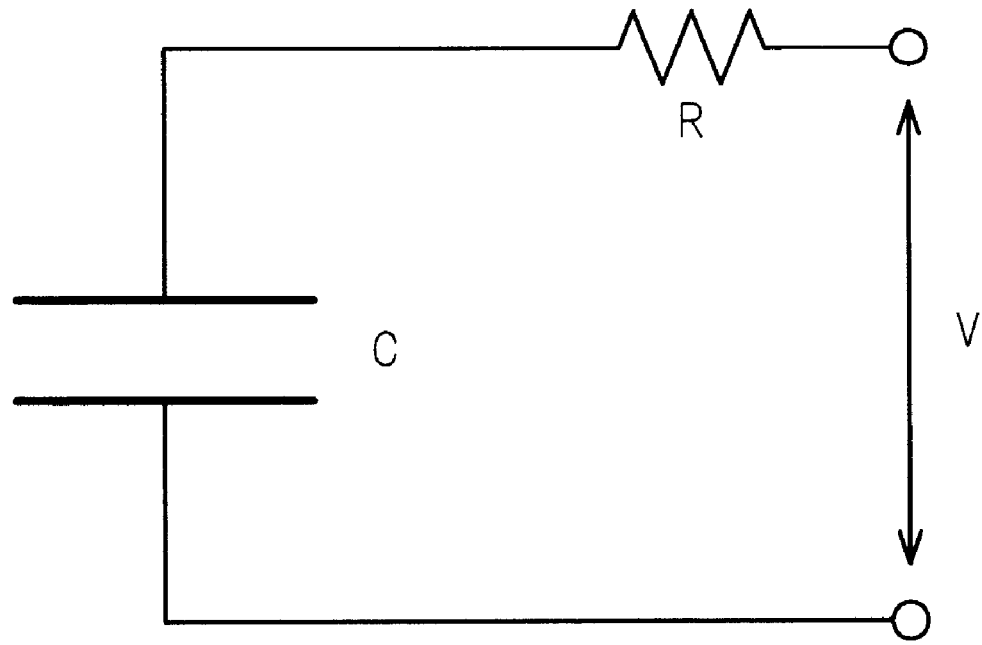
FIG. 5 is an explanatory view showing an equivalent circuit of the electrical double layer capacitor illustrated in FIG. 1 for explaining the operation shown in FIGS. 3 and 4 after engine starting.

FIG. 5 is a view showing an equivalent circuit of the electrical double layer capacitor 24. The capacitor, including the electrical double layer capacitor 24, is expressed in the ordinary manner of representation as static capacitance C and internal resistance R connected in series therewith. The electric charge Q accumulated in the capacitor can be expressed as:

$$Q = CV \qquad \text{Eq. 1,}$$

where V is the terminal voltage.

Substituting energy E for the electric charge Q and integrating with respect to voltage V, the amount of energy E stored in the capacitor such as the electrical double layer capacitor 24 can be obtained from the general equation:

$$E = (\tfrac{1}{2})CV^2 \qquad \text{Eq. 2.}$$

It follows, therefore, that the remaining charge of the electrical double layer capacitor 24 can be estimated from the measured terminal voltage (open-circuit terminal voltage) thereof.

However, under actual use conditions, such as in the configuration of FIG. 1, the electrical double layer capacitor 24 is connected with and charge/discharges through a load such as the motor 20. Since a voltage drop therefore arises owing to the internal resistance R, the remaining charge cannot be detected or estimated with good accuracy from the detected terminal voltage only.

In the system according to this embodiment, therefore, what is called a "state estimation observer" in modern control theory is used to detect or estimate the remaining charge with good accuracy.

In other words, the remaining charge Ve, more precisely the remaining charge-equivalent terminal voltage Ve, of the electrical double layer capacitor 24 is defined as a state variable, whose state equation can, assuming a discrete system, be written as Equation 3 below (where the second term on the right hand side is a value obtained based on Equation 1 by defining i=dQ/dt and integrating over time t). Thus in this specification, the remaining charge is calculated as a voltage value.

$$Ve(k+1) = Ve(k) + (1/C)\int i\, dt \qquad \text{Eq. 3,}$$

where k is the sample number, dt is the sample rate (execution interval of the FIG. 4 program), C is the (assumed to be known) static capacitance of the electrical double layer capacitor 24, Ve is the detected terminal voltage Vout (not taking the voltage drop into account), and i is the detected charge/discharge current.

As explained earlier, however, the terminal voltage Vout of the electrical double layer capacitor 24 varies with the internal resistance R and, therefore, the remaining charge calculated using Equation 3 differs from the actual or true value.

Defining the estimated remaining charge, more precisely the estimated remaining charge-equivalent terminal voltage, as Vehat, the error e between Vehat and the remaining charge-equivalent terminal voltage Ve of Equation 3 is as shown by Equation 4:

$$e(k)=A(Ve(k)-\text{Vehat}(k)) \qquad \text{Eq. 4.}$$

Equation 5 follows from Equation 4. Therefore, if A were a stable matrix and the eigenvalue lay within the unit circle, the error e would gradually approaches zero to make Vehat equal to Ve.

$$e(k+1)=Ae(k) \qquad \text{Eq. 5.}$$

Since A is not generally a stable matrix, however, the voltage drop calculated as the product of the detected charge/discharge current i and the internal resistance R is subtracted from the estimated remaining charge (more precisely, the estimated remaining charge-equivalent terminal voltage) Vehat, the difference obtained is defined as the estimated terminal voltage Vest, and the difference between it and the terminal voltage Vout (i.e., Vout−Vest) is calculated.

The estimated remaining charge (more precisely, the estimated remaining charge-equivalent terminal voltage) Vehat is then corrected (updated) by multiplying it by the product of the calculated difference and the observer gain. That is to say, the remaining charge is corrected (updated).

In other words, the system according to this embodiment of the invention is configured to perform the calculation of Equation 6:

$$\text{Vehat}(k+1)=\text{Vehat}(k)+(1/C)\int idt+Kc\{\text{Vout}-(\text{Vehat}(k)-Ri)\} \qquad \text{Eq. 6,}$$

where Kc is the observer gain.

The error e between the state variable and the estimated value is then recalculated by Equation 7:

$$e(k+1)=(A-Kc)e(k) \qquad \text{Eq. 7.}$$

This makes it possible to set the eigenvalue of the matrix A−Kc as desired so as to make it a stable matrix. The remaining charge of the electrical double layer capacitor 24 can therefore be detected (estimated) simply and accurately using Equation 6.

In other words, the remaining charge of the electrical double layer capacitor 24 can be calculated simply and with good accuracy by conducting the processing of S100 to S104 of the flow chart of FIG. 4 every prescribed interval (at the aforesaid sample rate).

Although not shown in the drawings, the amount of remaining energy of the electrical double layer capacitor is calculated based on the calculated remaining charge Vehat using Equation 2 (or Equation 1).

Figure 6:
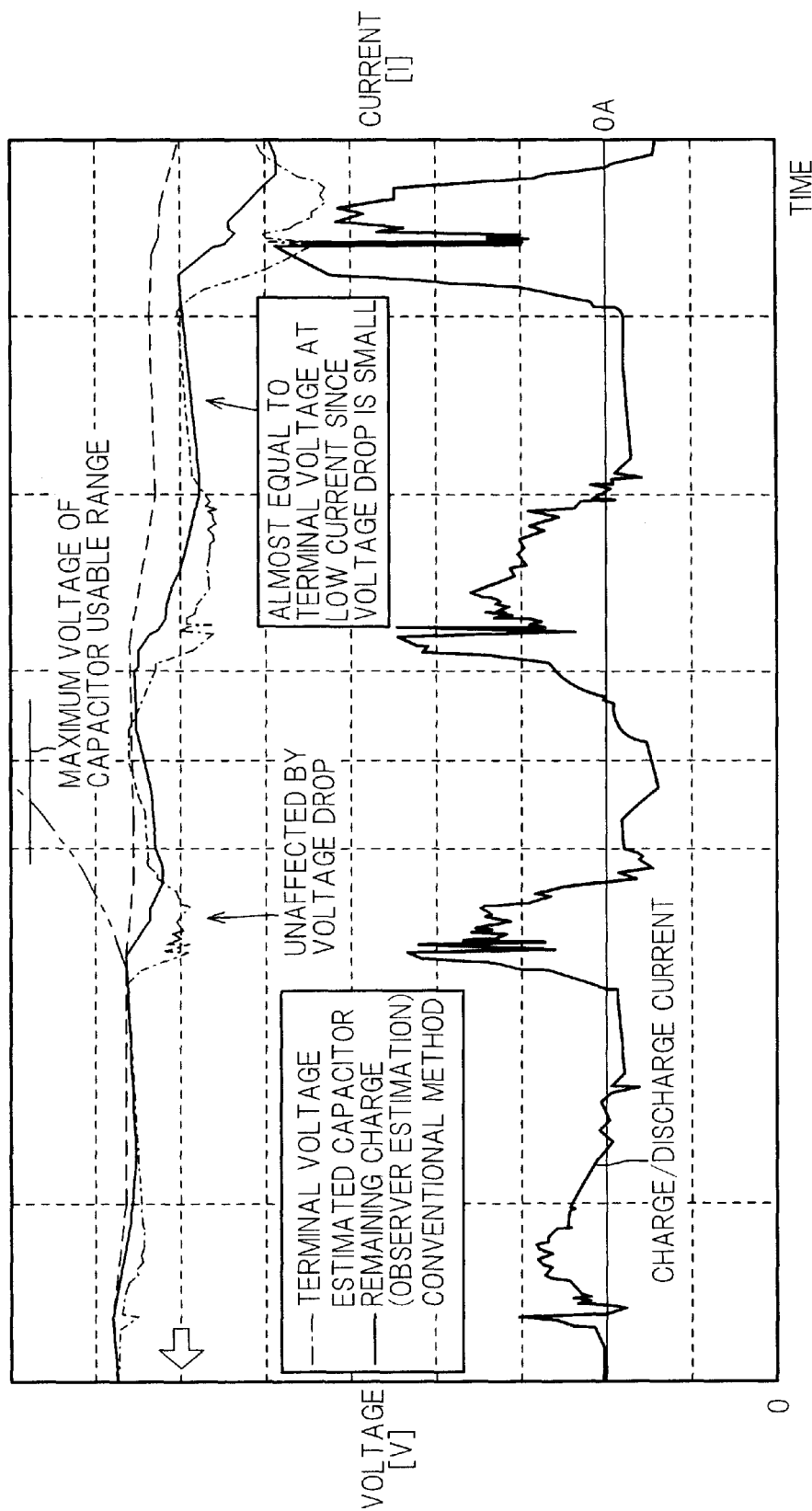
FIG. 6 is a simulation data showing a comparison of the remaining charge detection according to the present invention with that by the conventional method (current integration method) using simulation data based on measured values obtained by the operation illustrated in FIG. 4.

FIG. 6 compares the remaining charge detection by the embodiment (illustrated in solid line) with that by the conventional method (current integration method and illustrated in broken line) using simulation data based on measured values.

In the figure, the vertical axis on the left represents voltage [V] and that on the right represents current [A]. Current values greater than 0[A] indicate discharge and ones less than 0[A] indicate charge.

It can be seen from the figure that the remaining charge value by the observer estimation of the embodiment is unaffected by the drop in the terminal voltage (illustrated in alternate long and short dashed line) caused by the internal resistance and follows the variation in charge/discharge current more accurately than the remaining charge detection value by the conventional method (current integration method).

Having been configured in the foregoing manner in the system according to this embodiment, the remaining charge (more precisely, remaining charge-equivalent terminal voltage) Ve of the electrical double layer capacitor 24 is defined as a state variable of a mathematical model constituted as a state equation, an observer is designed for estimating the state variable, and the thus-designed state estimation observer is used to detect or estimate the remaining charge of the electrical double layer capacitor 24 based on the detected values of the current-voltage sensor 52. The remaining charge can therefore be detected or estimated simply and with good accuracy. Since a current-voltage sensor 52 of ordinary detection accuracy is therefore adequate, the improved detection or estimation accuracy can be achieved with no increase in cost.

Figure 7:
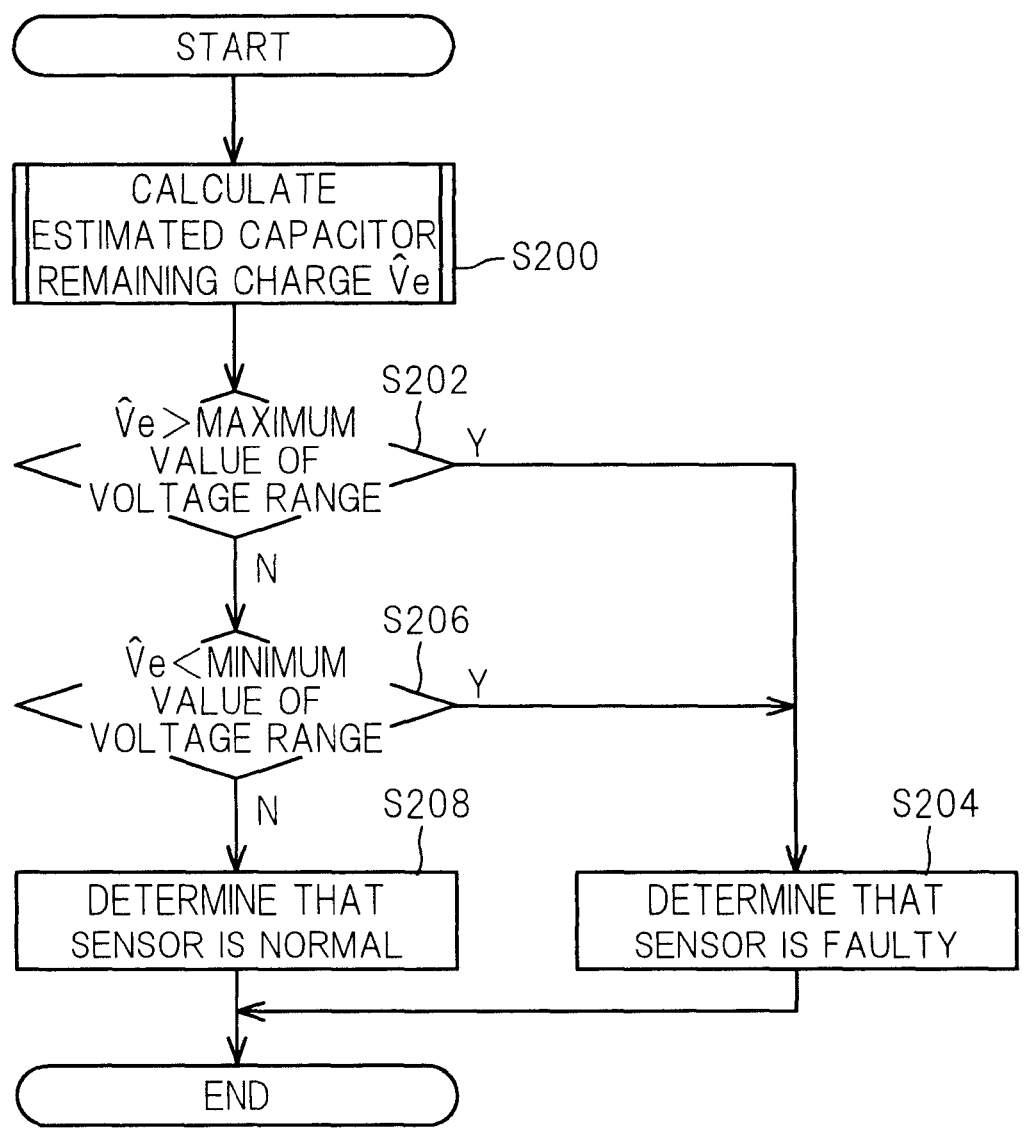
FIG. 7 is a flow chart showing the operation of a system for detecting the remaining charge of an electrical double layer capacitor according to a second embodiment of the present invention.

FIG. 7 is a flow chart showing the operations of a system for detecting or estimating the remaining charge of an electrical double layer capacitor according to a second embodiment of the present invention.

First, in S200, the estimated remaining charge Vehat of the electrical double layer capacitor 24 is calculated by processing according to the flow charts of FIGS. 3 and 4 of the first embodiment. Next, in S202, it is determined whether the calculated estimated remaining charge Vehat is greater than a predetermined maximum value of the voltage range. When the result is YES, the program proceeds to S204, in which it is determined that the current-voltage sensor 52 is faulty.

When the result in S202 is NO, the program proceeds to S206, in which it is determined whether the calculated estimated remaining charge Vehat is less than a predetermined minimum value of the voltage range. When the result is YES, the program proceeds to S204, in which it is determined that the current-voltage sensor 52 is faulty. When the result is NO, the program proceeds to S208, in which it is determined that the current-voltage sensor 52 is normal (not faulty).

The maximum and minimum values of the voltage range are set or determined beforehand near the upper and lower limits of the use range of the electrical double layer capacitor 24. (Only the maximum value of the voltage range is shown in FIG. 6.)

The procedure of FIG. 7 overcomes the following problem of the prior art. Namely, assuming that the conventional current integration method is adopted, the fact that the remaining charge estimation is highly dependent on the sensor output makes it necessary to detect or discriminate failure of the current-voltage sensor either by determining whether or not the sensor output is in the normal range (output range) or by separately installing an identical sensor and comparing the outputs of the two sensors. The configuration would therefore be complex.

In contrast, the system according to this embodiment, which defines the remaining charge as a state variable and monitors its behavior with an observer, can simply detect or discriminate failure of the current-voltage sensor 52 by comparing the estimated remaining charge obtained by the observer calculation with the maximum value and the minimum value set near the upper and lower limit values defining the use range of the electrical double layer capacitor.

In other words, since current-voltage sensor 52 failure causes the detected values of the terminal voltage Vout and charge/discharge current i to become abnormal, the observer estimation value diverges or oscillates to become an abnormal value. For example, as indicated by the alternate long and two short dashed line in FIG. 6, it may increase until exceeding the maximum value of the voltage range.

Failure of the current-voltage sensor 52 can therefore be simply detected or discriminated by comparing the estimated remaining charge with maximum and minimum values set near the upper and lower limit values that define the use range of the electrical double layer capacitor.

The first and second embodiments are thus configured to have a system for detecting remaining charge of an electric double layer capacitor (24), comprising: a current-voltage sensor (52, MGECU 36, S100) which generates an output indicative of a terminal voltage across terminals of the capacitor (Vout) and an output indicative of charge/discharge current charged into and discharged from the capacitor (i); and an electronic control unit (MGECU 36, S102, S104) which inputs the outputs of the current-voltage sensor indicative of the terminal voltage (Vout) and charge/discharge current (i) and calculates a remaining charge of the capacitor, more specifically, remaining charge-equivalent terminal voltage Ve; Vehat) based on a mathematical model (expressed by Eqs. 3 and 6) having the remaining charge of the capacitor as a state variable more precisely, based on a state equation (mathematical model) having the remaining charge of the capacitor as a state variable and an observer that observes the state equation, thereby enabling simple and accurate detection of the remaining charge of the electrical double layer capacitor without need for a high-precision current sensor.

In the system, the electronic control units includes; remaining charge calculating means (MGECU 36, S104) for inputting the detected terminal voltage (Vout) and charge/discharge current (i) to a state equation (expressed by Eqs. 3 and 6) constituting the mathematical model and for calculating the remaining charge of the capacitor (Ve, specifically, estimated remaining charge Vehat, more specifically, estimated remaining charge-equivalent terminal voltage Vehat); estimated terminal voltage calculating means (MGECU 36, S102) for calculating a voltage drop across the capacitor (Ri) based on the detected charge/discharge current (i) and an internal resistance of the capacitor (R) and for subtracting the calculated voltage drop from the calculated remaining charge to obtain an estimated terminal voltage of the capacitor (Vest); and remaining charge correcting means (MGECU 36, S104) for calculating a product obtained by multiplying a difference between the detected terminal voltage (Vout) and the estimated terminal voltage (Vest) by a gain of an observer (Kc) obtained from the state equation that estimates the state variable, and for correcting the remaining charge (Ve, more specifically, Vehat) based on the calculated product.

Thus, it calculates the remaining charge explicitly by use of a state estimation observer, thereby enabling simple and accurate detection of remaining charge.

The system further includes: sensor failure discriminating means (MGECU 36, S200 to S208) for discriminating whether or not the sensor (52) is faulty based the remaining charge (Ve, more precisely, Vehat). More specifically, the sensor failure discriminating means includes: maximum value comparing means (MGECU 36, S202) for comparing the remaining charge (Ve, more precisely, Vehat) with a maximum value of a voltage range of the capacitor; and failure determining means (MGECU 36, S204) for determining that the sensor is faulty when the remaining charge is greater than the maximum value. In addition, it includes: minimum value comparing means (MGECU 36, S206) for comparing the remaining charge (Ve, more precisely, Vehat) with a minimum value of a voltage range of the capacitor; and failure determining means (MGECU 36, S204) for determining that the sensor is faulty when the remaining charge is less than the minimum value. Thus, it enables failure of the sensor to be simply detected by basing the detection on the remaining charge.

In the system, the capacitor is used as an energy source of a hybrid vehicle including an internal combustion engine (10) connected to driven wheels (16) through a transmission (149 to drive the wheels; an electric motor (20) connected with the driven wheels through the transmission to drive the vehicle independently of the engine; and a battery (30) connected to the capacitor; wherein the capacitor is connected to the motor to supply a current to the motor and is connected to the battery to discharge to and to be charged from the battery.

Although the invention has been explained with respect to the case where the electrical double layer capacitor 24 is used in a hybrid vehicle, it is not limited to this application but can also be applied for detecting the remaining charge of an electrical double layer capacitor used for any of various other purposes.

The entire disclosure of Japanese Patent Application No. 2001-017454 filed on Jan. 25, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for detecting remaining charge of an electric double layer capacitor, comprising:

a current-voltage sensor which generates an output indicative of a terminal voltage across terminals of the capacitor and an output indicative of charge/discharge current charged into and discharged from the capacitor;

an electronic control unit which inputs the outputs of the current-voltage sensor indicative of the terminal voltage and charge/discharge current and calculates a remaining charge of the capacitor based on a mathematical model having the remaining charge of the capacitor as a state variable, wherein the electronic control unit comprises:

remaining charge calculating means for inputting the detected terminal voltage and charge/discharge current to a state equation constituting the mathematical model and for calculating the remaining charge of the capacitor;

estimated terminal voltage calculating means for calculating a voltage drop across the capacitor based on the detected charge/discharge current and an internal resistance of the capacitor and for subtracting the calculated voltage drop from the calculated remaining charge to obtain an estimated terminal voltage of the capacitor; and remaining charge correcting means for calculating a product obtained by multiplying a difference between the detected terminal voltage and the estimated terminal voltage by a gain of an observer obtained from the state equation that estimates the state variable, and for correcting the remaining charge based on the calculated product.

2. A system for detecting remaining charge of an electric double layer capacitor, comprising:
   a current-voltage sensor which generates an output indicative of a terminal voltage across terminals of the capacitor and an output indicative of charge/discharge current charged into and discharged from the capacitor;
   an electronic control unit which inputs the outputs of the current-voltage sensor indicative of the terminal voltage and charge/discharge current and calculates a remaining charge of the capacitor based on a mathematical model having the remaining charge of the capacitor as a state variable; and
   sensor failure discriminating means for discriminating whether or not the sensor is faulty based on the remaining charge.

3. A system according to claim 2, wherein the sensor failure discriminating means includes:
   maximum value comparing means for comparing the remaining charge with a maximum value of a voltage range of the capacitor; and
   failure determining means for determining that the sensor is faulty when the remaining charge is greater than the maximum value.

4. A system according to claim 2, wherein the sensor failure discriminating means includes:
   minimum value comparing means for comparing the remaining charge with a minimum value of a voltage range of the capacitor; and
   failure determining means for determining that the sensor is faulty when the remaining charge is less than the minimum value.

5. A system according to claim 1, wherein the capacitor is used as an energy source of a hybrid vehicle.

6. A system according to claim 5, wherein the hybrid vehicle includes:
   an internal combustion engine connected to driven wheels through a transmission to drive the wheels;
   an electric motor connected with the driven wheels through the transmission to drive the vehicle independently of the engine; and
   a battery connected to the capacitor;
   wherein the capacitor is connected to the motor to supply a current to the motor and is connected to the battery to discharge to and to be charged from the battery.

7. A method of detecting remaining charge of an electric double layer capacitor, having a current-voltage sensor which generates an output indicative of a terminal voltage across terminals of the capacitor and an output indicative of charge/discharge current charged into and discharged from the capacitor: comprising the step of:
   (a) inputting the outputs of the current-voltage sensor indicative of the terminal voltage and charge/discharge current and calculating a remaining charge of the capacitor based on a mathematical model having the remaining charge of the capacitor as a state variable wherein step (a) includes the steps of:
   (b) inputting the detected terminal voltage and charge/discharge current to a state equation constituting the mathematical model and calculating the remaining charge of the capacitor;
   (c) calculating a voltage drop across the capacitor based on the detected charge/discharge current and an internal resistance of the capacitor and subtracting the calculated voltage drop from the calculated remaining charge to obtain an estimated terminal voltage of the capacitor; and
   (d) calculating a product obtained by multiplying a difference between the detected terminal voltage and the estimated terminal voltage by a gain of an observer obtained from the state equation that estimates the state variable, and correcting the remaining charge based on the calculated product.

8. A method of detecting remaining charge of an electric double layer capacitor, having a current-voltage sensor which generates an output indicative of a terminal voltage across terminals of the capacitor and an output indicative of charge/discharge current charged into and discharged from the capacitor: comprising the steps of:
   (a) inputting the outputs of the current-voltage sensor indicative of the terminal voltage and charge/discharge current and calculating a remaining charge of the capacitor based on a mathematical model having the remaining charge of the capacitor as a state variable; and
   (e) discriminating whether or not the sensor is faulty based on the remaining charge.

9. A method according to claim 8, wherein the step (e) includes the steps of:
   (f) comparing the remaining charge with a maximum value of a voltage range of the capacitor; and
   (g) determining that the sensor is faulty when the remaining charge is greater than the maximum value.

10. A method according to claim 8, wherein the step (e) includes the steps of:
    (h) comparing the remaining charge with a minimum value of a voltage range of the capacitor; and
    (i) determining that the sensor is faulty when the remaining charge is less than the minimum value.

11. A method according to claim 7, wherein the capacitor is used as an energy source of a hybrid vehicle including an internal combustion engine connected to driven wheels through a transmission to drive the wheels; an electric motor connected with the driven wheels through the transmission to drive the vehicle independently of the engine; and a battery connected to the capacitor;
    wherein the capacitor is connected to the motor to supply a current to the motor and is connected to the battery to discharge to and to be charged from the battery.

* * * * *